United States Patent
Yano et al.

(10) Patent No.: US 11,450,114 B2
(45) Date of Patent: Sep. 20, 2022

(54) INFORMATION PROCESSING APPARATUS, INFORMATION PROCESSING METHOD, AND COMPUTER-READABLE STORAGE MEDIUM, FOR ESTIMATING STATE OF OBJECTS

(71) Applicant: CANON KABUSHIKI KAISHA, Tokyo (JP)

(72) Inventors: Kotaro Yano, Tokyo (JP); Yasuo Bamba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

(21) Appl. No.: 15/942,301

(22) Filed: Mar. 30, 2018

(65) Prior Publication Data
US 2018/0285656 A1    Oct. 4, 2018

(30) Foreign Application Priority Data
Apr. 4, 2017  (JP) .............................. JP2017-074335

(51) Int. Cl.
*G06V 20/52*    (2022.01)
*G06K 9/62*    (2022.01)
(Continued)

(52) U.S. Cl.
CPC .......... *G06V 20/53* (2022.01); *G06K 9/6271* (2013.01); *G06T 7/246* (2017.01); *G06T 11/20* (2013.01);
(Continued)

(58) Field of Classification Search
CPC ............. G06K 9/00778; G06K 9/6271; G06K 9/4628; G06K 9/00335; G06T 11/20;
(Continued)

(56) References Cited

U.S. PATENT DOCUMENTS

| 10,417,773 B2 * | 9/2019 | Yano ........................ G06T 7/248 |
| 2005/0105771 A1 * | 5/2005 | Nagai ................... G06V 10/449 |
| | | 382/103 |

(Continued)

FOREIGN PATENT DOCUMENTS

| JP | 2012022370 A | 2/2012 |
| JP | 2015103104 A | 6/2015 |
| WO | 2016114134 A1 | 7/2016 |

OTHER PUBLICATIONS

Chuan Wang, et al., Deep People Counting in Extremely Dense Crowds, MM '15, Proceedings of the 23rd ACM International conference on Multimedia, Oct. 26-30, 2015, 4 pages, ACM, Brisbane, Australia.

(Continued)

*Primary Examiner* — John W Lee
(74) *Attorney, Agent, or Firm* — Canon U.S.A., Inc. I.P. Division

(57) ABSTRACT

An information processing apparatus includes a first estimation unit configured to estimate, for each of a plurality of images successive in time series, the number of objects existing in each of a plurality of set regions, and a second estimation unit configured to estimate a flow of the objects existing in each of the plurality of regions based on a result of the estimation for each of the plurality of images by the first estimation unit.

17 Claims, 13 Drawing Sheets

(51) Int. Cl.
*G06T 7/246* (2017.01)
*G06T 11/20* (2006.01)
*G06V 10/44* (2022.01)
*G06V 40/20* (2022.01)
*G06V 10/82* (2022.01)

(52) U.S. Cl.
CPC ............ *G06V 10/454* (2022.01); *G06V 40/20* (2022.01); *G06T 2207/10016* (2013.01); *G06T 2207/20021* (2013.01); *G06T 2207/20081* (2013.01); *G06T 2207/20084* (2013.01); *G06T 2207/30196* (2013.01); *G06T 2207/30241* (2013.01); *G06T 2207/30242* (2013.01)

(58) Field of Classification Search
CPC ........... G06T 7/246; G06T 2207/20081; G06T 2207/30196; G06T 2207/30242; G06T 2207/10016; G06T 2207/20021; G06T 2207/30241; G06T 2207/20084
See application file for complete search history.

(56) References Cited

U.S. PATENT DOCUMENTS

| | | | |
|---|---|---|---|
| 2008/0112595 A1* | 5/2008 | Loos | G06T 7/269 382/107 |
| 2013/0113934 A1* | 5/2013 | Hotta | G06V 20/53 348/143 |
| 2014/0286593 A1* | 9/2014 | Numata | G06T 5/002 382/275 |
| 2015/0146006 A1* | 5/2015 | Kawano | H04N 7/181 348/159 |
| 2016/0140408 A1* | 5/2016 | Shen | G06N 3/084 382/157 |

OTHER PUBLICATIONS

Sepp Hochreiter, et al., Long short-term memory, Neural Computation 9, Feb. 24, 1997, pp. 1735-1780, Massachusetts Institute of Technology.

\* cited by examiner

INFORMATION PROCESSING APPARATUS, INFORMATION PROCESSING METHOD, AND COMPUTER-READABLE STORAGE MEDIUM, FOR ESTIMATING STATE OF OBJECTS

BACKGROUND

Field

The present disclosure relates to an information processing apparatus, an information processing method, and a program for estimating the state of objects in a space.

Description of the Related Art

A technique for capturing an image of a predetermined area by a camera, counting the number of objects, such as people, in the image by analyzing the captured image, and analyzing a flow of the objects has been recently proposed. It is expected that such a technique can be utilized for, for example, detection of a congestion of people in a public space, solving the congestion during an event by understanding the flow of people in a crowd, and developing evacuation guidance in case of a disaster.

As a method for counting the number of people in an image, a method of estimating the number of objects in an image by using a neural network obtained by machine learning is known, e.g., see Wang et al. Deep People Counting in Extremely Dense Crowds, Proceedings of the 23rd ACM international conference on Multimedia, 2015. In addition, a method of estimating the degree of congestion in a wide range by using object number estimation results obtained from monitoring images captured by a plurality of cameras is discussed in Japanese Patent Application Laid-Open No. 2015-103104. Further, as a method for analyzing the flow of objects in an image, a method of determining a non-steady state of a crowd by counting attributes of optical flows is known (see Japanese Patent Application Laid-Open No. 2012-22370).

However, the techniques discussed in Japanese Patent. Application Laid-Open No. 2015-103104 and Wang et al. described above are used to count the number of objects in an image, and thus are not sufficient to understand the flow of objects. Accordingly, an abnormality or the like in the space at issue cannot be fully grasped, for example. By contrast, in the technique discussed in Japanese Patent Application Laid-Open No. 2012-22370, it is possible to obtain an understanding of the flow of objects, but it is impossible to obtain an understanding of the number of objects at the same time. Therefore, the non-steady state cannot be fully accurately determined. As described above, in the related art techniques, the state of objects and the like in the space within an image capturing range cannot be fully understood.

SUMMARY

Various embodiments of the present disclosure are directed to a technique for enabling an accurate estimation of the state of objects in a space.

According to various embodiments, an information processing apparatus includes a first estimation unit configured to estimate, for each of a plurality of images successive in time series, the number of objects existing in each of a plurality of set regions, and a second estimation unit configured to estimate a flow of the objects existing in each of the plurality of regions based on a result of the estimation for each of the plurality of images by the first estimation unit.

Further features will become apparent from the following description of exemplary embodiments with reference to the attached drawings.

DESCRIPTION OF THE EMBODIMENTS

Exemplary embodiments will be described in detail below with reference to the drawings.

Figure 1:
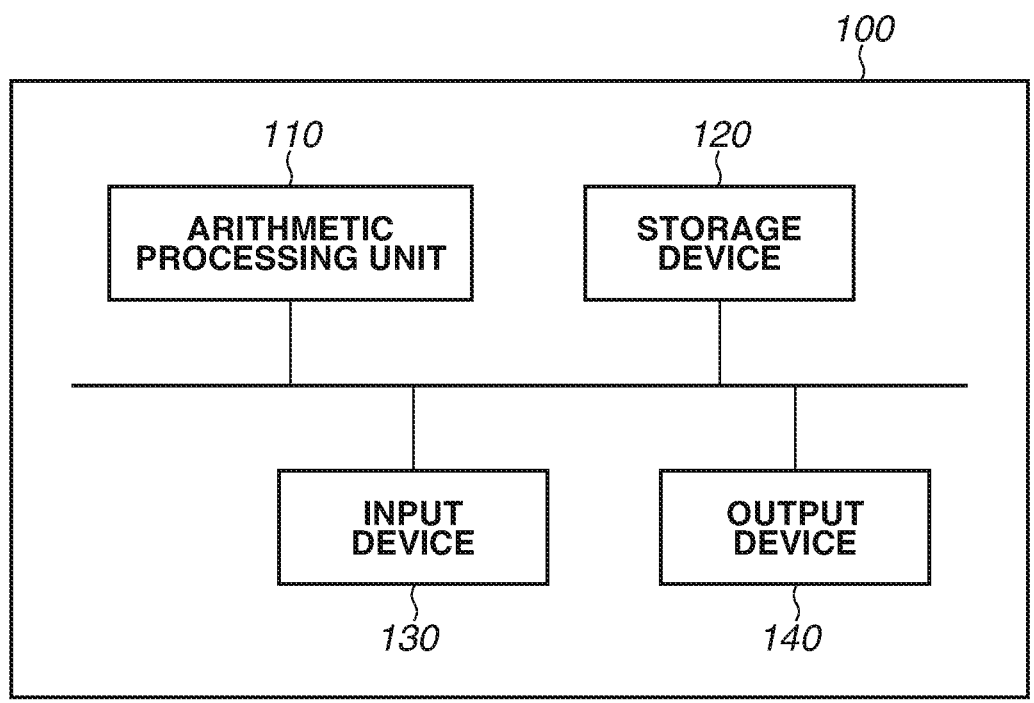
FIG. 1 is a block diagram illustrating an example of a hardware configuration of an information processing apparatus according to one embodiment.

FIG. 1 is a block diagram illustrating an example of a hardware configuration of an information processing apparatus 100 according to a first exemplary embodiment. The information processing apparatus 100 includes an arithmetic processing unit 110, a storage device 120, an input device 130, and an output device 140. The components are configured so as to be communicable with each other and connected to each other via a bus or the like.

The arithmetic processing unit 110 controls the operation of the information processing apparatus 100 to, for example, execute programs stored in the storage device 120. The arithmetic processing unit 110 is composed of a central processing unit (CPU), a graphics processing unit (CPU), or the like. The storage device 120 is a storage device, for example, a magnetic storage device or a semiconductor memory. The storage device 120 stores, for example, programs loaded based on the operation of the arithmetic processing unit 110, and data to be stored for a long period of time. In the present exemplary embodiment, the arithmetic processing unit 110 performs processing in accordance with procedures of programs stored in the storage device 120, thereby implementing functions of the information processing apparatus 100 as described below with reference to FIG. 2, processing of flowcharts as described below with reference to FIGS. 3 and 9, and the like. The storage device 120 also stores images to be processed by the information processing apparatus 100, detection results, and the like.

The input device 130 is, for example, a mouse, a keyboard, a touch panel device, or a button, and is used to input various types of instructions. The input device 130 may include an image pickup device such as a camera. In this case, the arithmetic processing unit 110 can acquire images captured by the image pickup device included in the input device 130. The output device 140 is, for example, a liquid crystal panel or an external monitor, and outputs various types of information.

The hardware configuration of the information processing apparatus 100 is not limited to the configuration illustrated in FIG. 1. For example, the information processing apparatus 100 may include an input/output (I/O) device for communicating with an external information processing apparatus and various devices such as a network camera. The I/O device is, for example, a memory card, an input/output unit, such as a universal serial bus (USB) cable, or a transmission/reception unit using wired or wireless communication.

Figure 2:
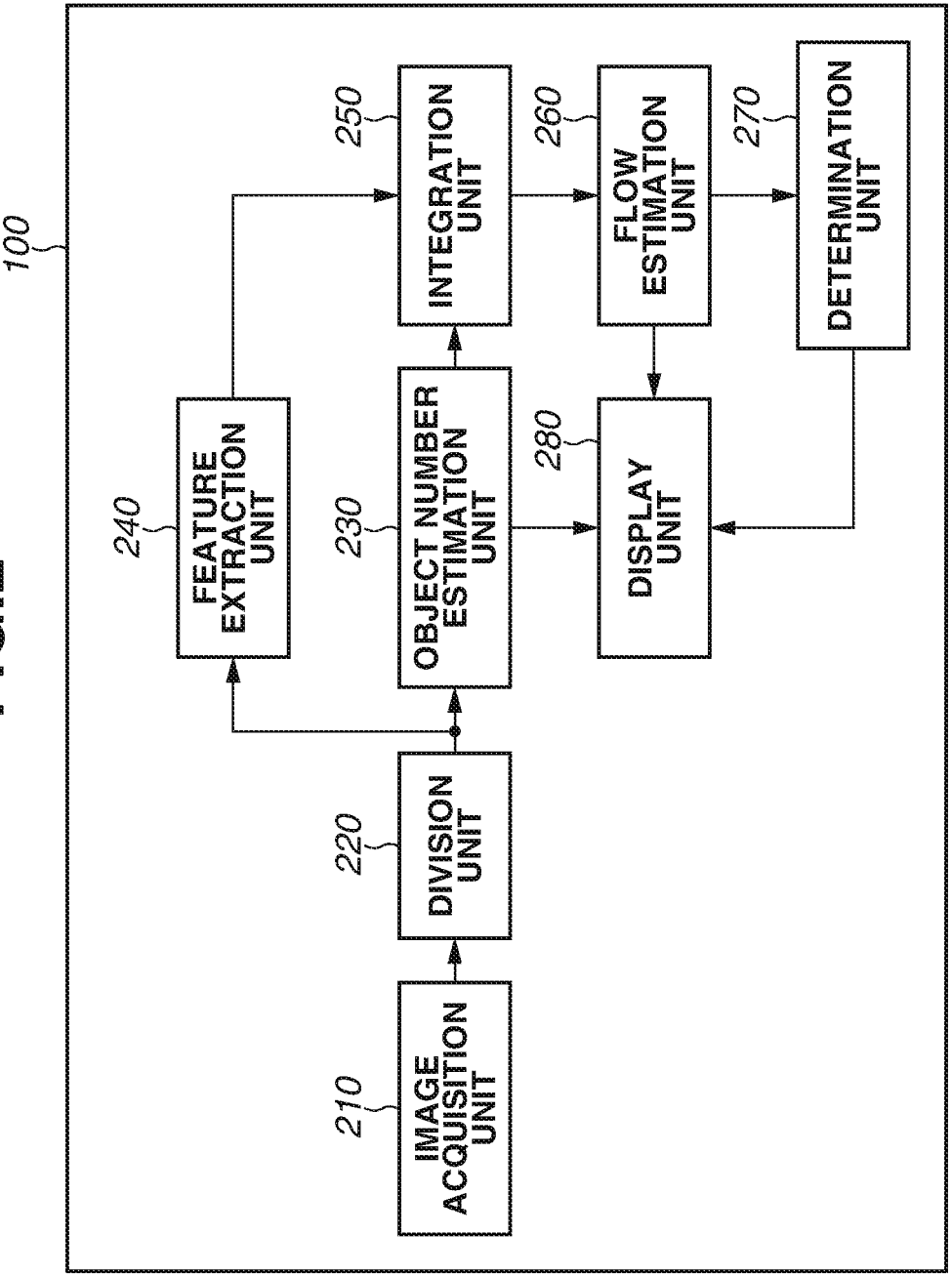
FIG. 2 is a block diagram illustrating a functional configuration of the information processing apparatus according to one embodiment.

FIG. 2 illustrates an example of the functional configuration of the information processing apparatus 100. As illustrated in FIG. 2, the information processing apparatus 100 includes an image acquisition unit 210, a division unit 220, an object number estimation unit 230, a feature extraction unit 240, an integration unit 250, a flow estimation unit 260, a determination unit 270, and a display unit 280.

The image acquisition unit 210 acquires image data captured by a camera included in the input device 130 from the camera. The image data is data regarding time-series images, the time series images including a plurality of images successive in time series, such as a moving image or a live image.

The division unit 220 divides frame images of the time-series images acquired by the image acquisition unit 210 into a plurality of local regions. Each of the local regions obtained through division by the division unit 220 is hereinafter referred to as a divided region.

The object number estimation unit 230 estimates, for each flame image included in the time-series images, the number of objects existing in each divided region.

The feature extraction unit 240 extracts a motion feature from each divided region in the frame images of the time-series images acquired by the image acquisition unit 210.

The integration unit 250 integrates the estimation results of the number of objects in a plurality of divided regions estimated by the object number estimation unit 230 with the motion features extracted by the feature extraction unit 240.

The flow estimation unit 260 sequentially receives, as an input, the results integrated by the integration unit 250 for each frame image included in the time-series images acquired by the image acquisition unit 210, and estimates the flow of objects in each of the divided regions based on the received input.

The determination unit 270 determines whether an abnormality has occurred based on a change in the flow of objects in the plurality of divided regions estimated by the flow estimation unit 260.

The display unit 280 displays, on the output device 140 or the like, information indicating the estimation results obtained by the object number estimation unit 230 and the flow estimation unit 260 and the determination results obtained by the determination unit 270.

Figure 3:
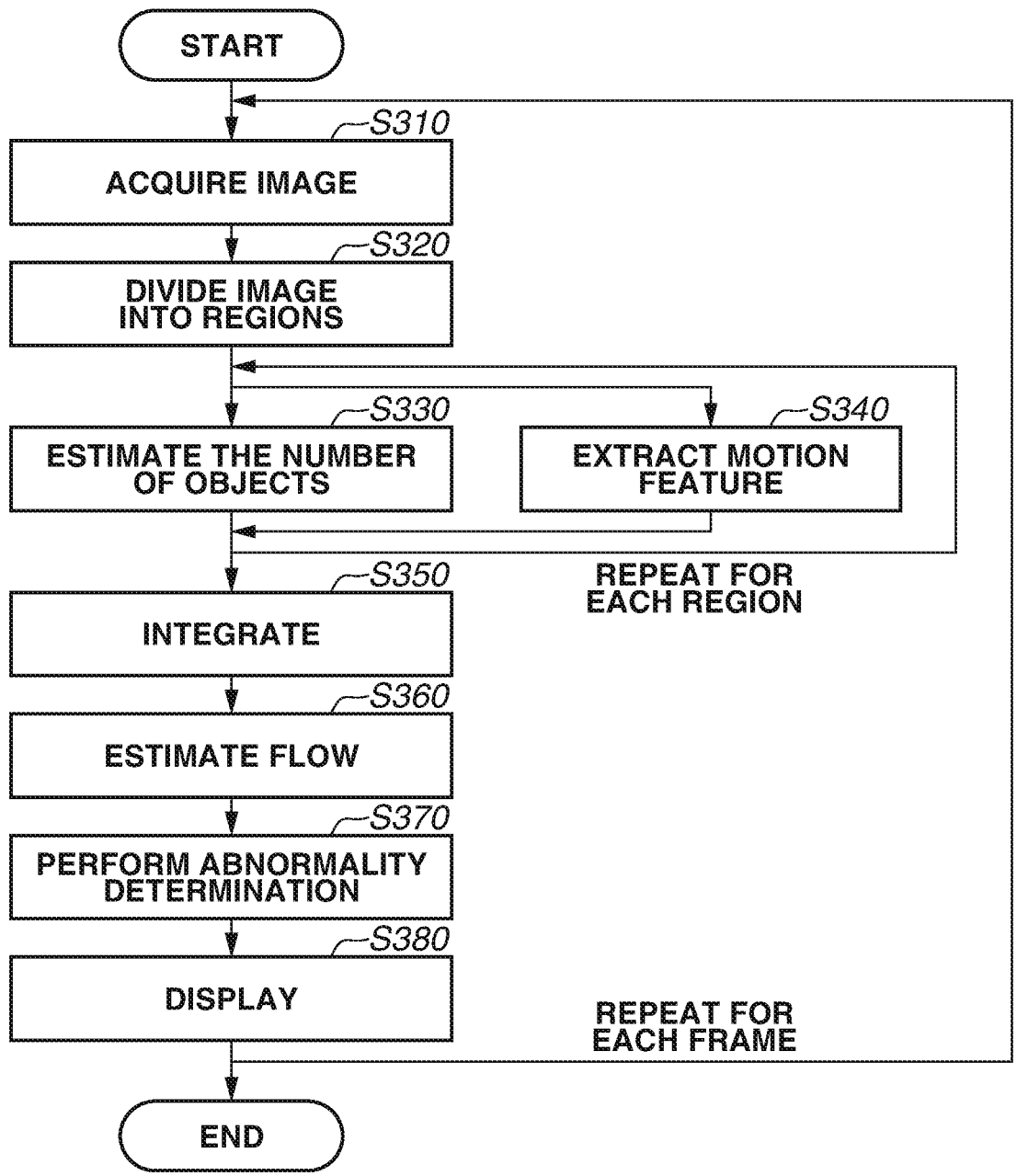
FIG. 3 is a flowchart illustrating an example processing to be performed by the information processing apparatus according to one embodiment.
Figure 4:
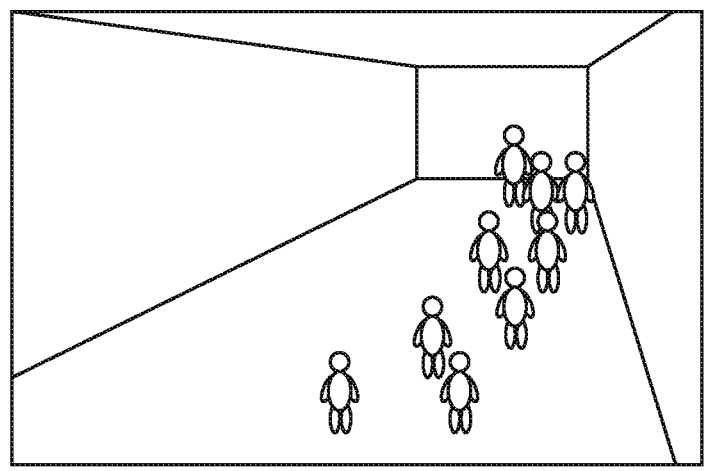
FIG. 4 illustrates an example of an image to be processed.

FIG. 3 is a flowchart illustrating an example of processing to be performed by the information processing apparatus 100. The processing to be performed by the information processing apparatus 100 according to the present exemplary embodiment will be described below with reference to FIG. 3. An example in which processing of analyzing a crowd in an image is performed on the image of a scene that is illustrated in FIG. 4 and captured by a monitoring camera included in the input device 130 will be described below. In the present exemplary embodiment, the objects whose number and flow are estimated are human bodies. However, the objects whose number and flow are estimated may be objects other than human bodies, such as animals, vehicles, or cargos.

In step S310, the image acquisition unit 210 acquires image data captured by the monitoring camera included in the input device 130. The image acquisition unit 210 sequentially acquires, in time series, the image data of two-dimensional data format composed of 8-bit RGB pixels, from the monitoring camera included in the input device 130. The image acquisition unit 210 may acquire image data of other formats, such as a JPEG format, from the monitoring camera included in the input device 130.

Figure 5:
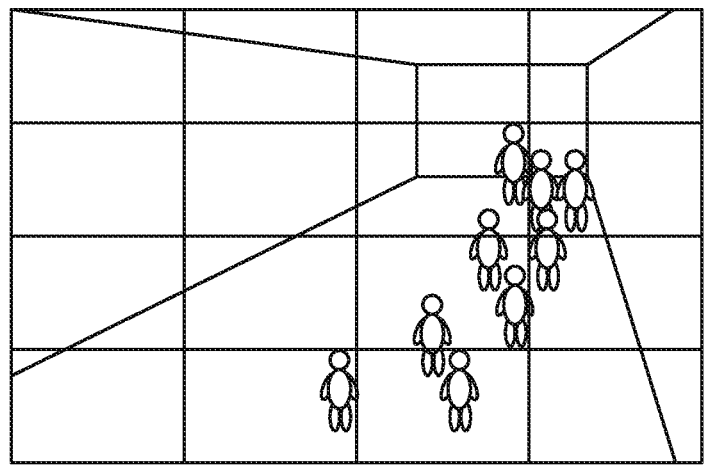
FIG. 5 illustrates an example of image division according to one embodiment.

In step S320, the division unit 220 divides the image data acquired by the image acquisition unit 210 into a plurality of divided regions. FIG. 5 illustrates an example of an image divided into a plurality of divided regions by the division unit 220. As illustrated in FIG. 5 the division unit 220 may divide the image data into a plurality of rectangular divided regions of the same size, or may divide the image data into a plurality of divided regions of different sizes. Alternatively, the division unit 220 may divide the image data into divided regions so as to overlap each other, or may divide the image data into divided regions other than rectangular divided regions, such as triangular or circular divided regions.

In step S330, the object number estimation unit 230 estimates the number of objects in each of the divided regions in the image divided in step S320. In the present exemplary embodiment, the object number estimation unit 230 estimates the number of people in the image for each divided region. The object number estimation unit 230 uses, as an estimation method, a deep neural network discussed in the paper written by Wang et al. as described above.

Figure 6:
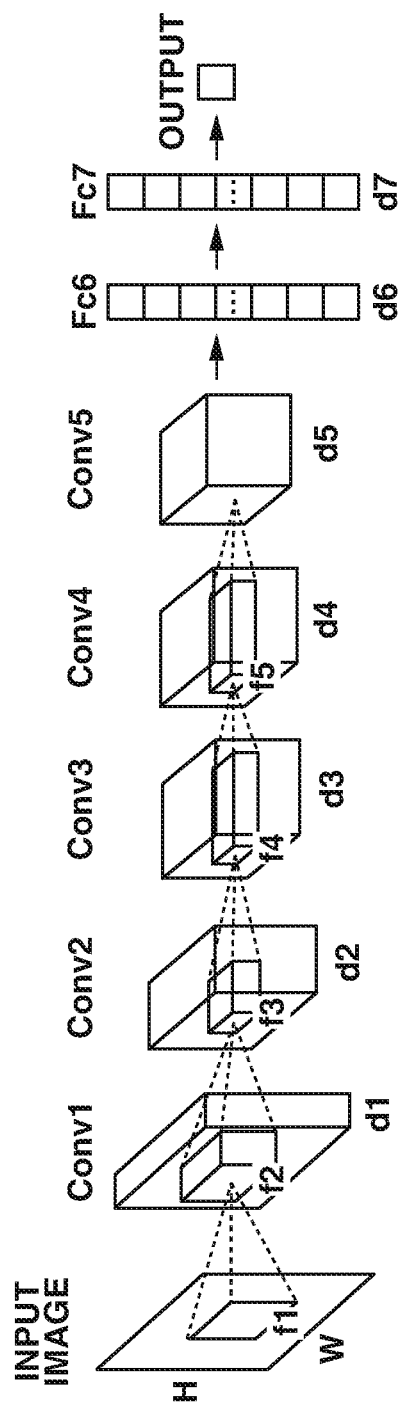
FIG. 6 illustrates an example of a neural network according to one embodiment.

FIG. 6 illustrates an example of the neural network. In this neural network, a convolutional neural network operation of a five-layer configuration is carried out using RGB images in each local region having a resolution of H×W as an input. A fully connected neural network operation for sixth and seventh layers is carried out on the operation result, thereby obtaining an output. In FIG. 6, f1 to f5 represent filter sizes of convolution operations in first to fifth layers, respectively, and d1 to d7 represent output channel numbers in first to seventh layers, respectively. A last layer acquires the number-of-people estimated value from the output of the seventh layer. The object number estimation unit 230 may estimate the number of people by obtaining a feature amount from each region of the image by a method other than the neural network. The object number estimation unit 230 may estimate the number of objects existing in each divided region by detecting objects from each divided region using, for example, pre-learned classifiers and counting the number of the detected objects.

In step S340, the feature extraction unit 240 extracts, for two frame images successive in time series, a motion feature from each divided region obtained through the division in step S320.

Figure 7:
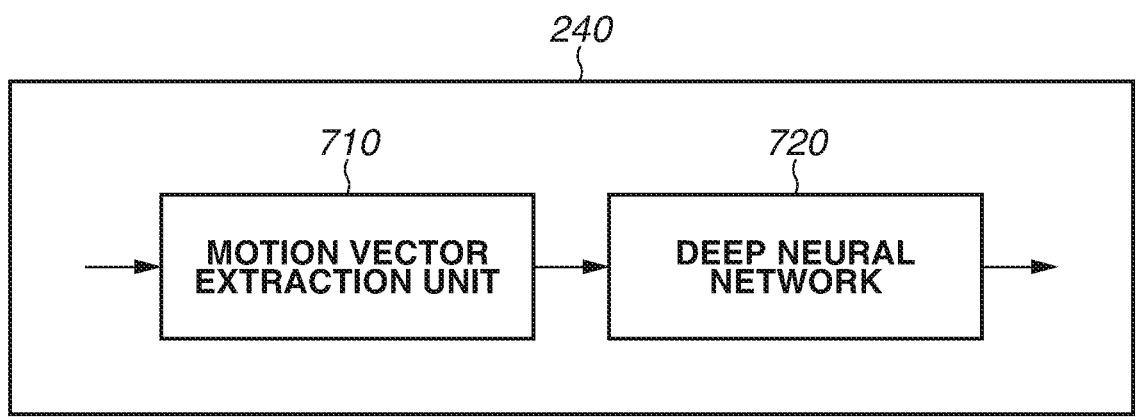
FIG. 7 is a block diagram illustrating an example of a detailed configuration of a feature extraction unit according to one embodiment.

FIG. 7 illustrates an example of the detailed configuration of the feature extraction unit 240 according to the present exemplary embodiment. As illustrated in FIG. 7, the feature extraction unit 240 includes a motion vector extraction unit 710 and a deep neural network 720. The motion vector extraction unit 710 extracts a motion vector for each pixel from the divided regions of the two frame images successive in time series. The deep neural network 720 has a configuration similar to that of the neural network illustrated in FIG. 6. The input of the neural network includes horizontal and vertical components of the motion vector in each divided region having a resolution of H×W, and the seventh layer outputs the motion feature.

Output values from the object number estimation unit 230 and the feature extraction unit 240 are values obtained by normalizing values in a predetermined range to a range of [−1,1].

The processing of steps S330 and S340 is repeatedly performed on each of the divided regions obtained through the division in step S320. As a result, the estimation result of the number of objects and the motion feature are obtained for each of the plurality of divided regions. It does not matter which one of steps S330 and S340 is first carried out.

In step S350, the integration unit 250 integrates the estimation results of the number of objects in the plurality of divided regions estimated in step S330 with the motion features extracted in step S340. In the present exemplary embodiment, the integration unit 250 integrates the estimation result of the number of objects estimated in step S330 with the output result of the seventh layer in the deep neural network of the object number estimation unit 230 as the feature amount used for flow estimation in step S360. The integration unit 250 connects the object number estimation results, the output results of the seventh layer, and the motion features (output results of the seventh layer in the deep neural network of the feature extraction unit 240) corresponding to the number of divided regions, into one feature vector. The feature vector is an example of integrated information obtained by integrating the results of estimating the number of objects for each of the plurality of divided regions. Further, the integration unit 250 outputs the feature vector to the flow estimation unit 260.

However, the integration unit 250 may integrate the estimation results of the number of objects in the plurality of divided regions estimated in step S330 into one feature vector and output the feature vector to the flow estimation unit 260.

In step S360, the flow estimation unit 260 sequentially receives, as an input, the feature vector obtained through the integration in step S350 for each frame image of the time-series images acquired in step S310, and estimates the flow of the objects in each divided region based on the received input.

Figure 8:
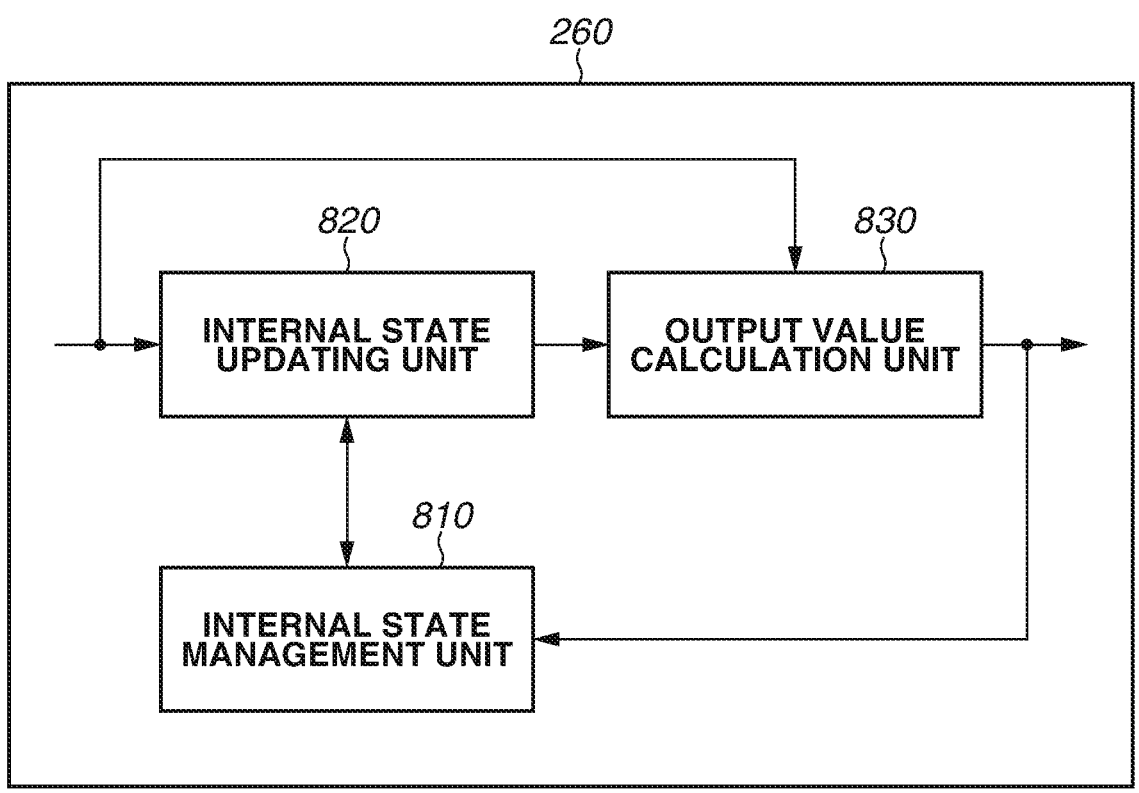
FIG. 8 is a block diagram illustrating an example of a detailed configuration of a flow estimation unit according to one embodiment.

FIG. 8 illustrates an example of the detailed configuration of the flow estimation unit 260 according to the present exemplary embodiment. As illustrate in FIG. 8, the flow estimation unit 260 includes an internal state management unit 810, an internal state updating unit 820, and an output value calculation unit 830. The internal state management unit 810 manages past internal states stored in the storage device 120 and past output values output from the flow estimation unit 260. The internal state updating unit 820 sequentially receives, as an input, the feature vector obtained through the integration in step S350 for each frame image of the time-series images acquired in step S310. Further, the internal state updating unit 820 updates the internal state based on the past internal states and output values managed by the internal state management unit 810. The output value calculation unit 830 calculates the output value by converting the internal state updated by the internal state updating unit 820.

The flow estimation unit 260 can implement the functions as illustrated in FIG. 8 by using a long short-term memory (LSTM) discussed in "Seep Hochreiter and Jurgen Schmidhuber, Long Short-term Memory, Neuralcomputation, 1997". In the present exemplary embodiment, the flow estimation unit 260 outputs the output value calculated by the output value calculation unit 830 as a representative motion vector for each divided region obtained through the division in step S320. The flow estimation unit 260 sets, as the output value, the value obtained by normalizing a value in the predetermined range to the range of [−1,1].

Figure 9:
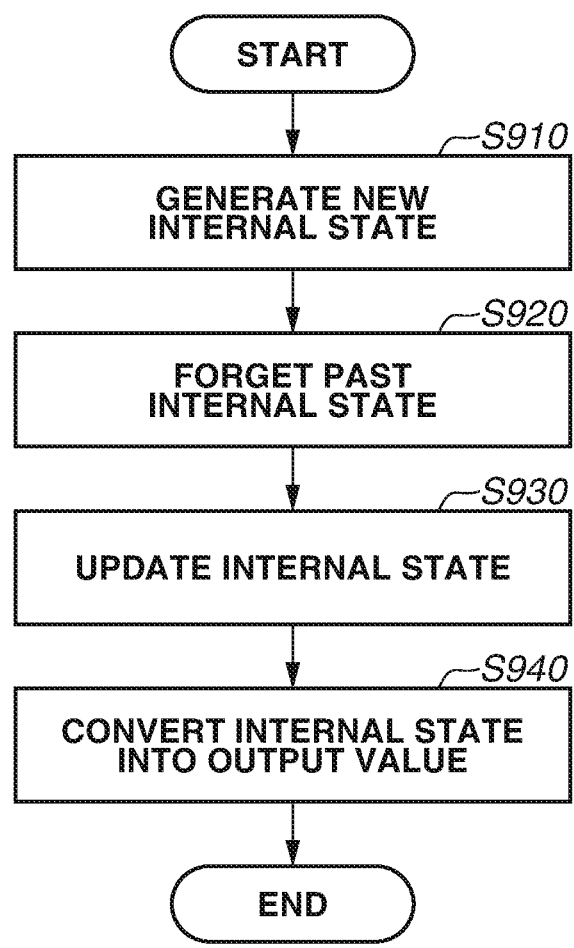
FIG. 9 is a flowchart illustrating an example of processing to be performed by the flow estimation unit according to one embodiment.

FIG. 9 is a flowchart illustrating an example of processing to be performed by the flow estimation unit 260. The processing to be performed by the flow estimation unit 260 according to the present exemplary embodiment will be described in detail with reference to FIG. 9.

In step 910, the internal state updating unit 820 generates a new internal state based on the feature vector received from the integration unit 250 and the past output values managed by the internal state management unit 810. The internal state updating unit 820 obtains a new internal state C' by the following formula (1) assuming that the feature vector received from the integration unit 250 at time t is represented by $X_t$ and the output value at the past time (t−1) is represented by $Y_{t-1}$.

$$C' = \varphi(w_c \cdot [Y_{t-1}, X_t] + b_c) \quad (1)$$

In step S920, the internal state updating unit 820 updates the internal state based on the received feature vector and the past output values managed by the internal state management unit 810. The internal state updating unit 820 acquires an internal state $C_t$ by the following formulas (2) and (3) assuming that the past internal state at time (t−1) is represented by $C_{t-1}$. $f_t$ in formulas (2) and (3) represents a coefficient for controlling the forgetting of the past internal state, and takes a value in the range of [0,1].

$$f_t = \sigma(w_f[Y_{t-1}, X_t] + b_f) \quad (2)$$

$$C_t = f_t C_{t-1} \quad (3)$$

In step S930, the internal state updating unit 820 determines how much the new internal state obtained in step S910 is to be stored based on the feature vector received in step S350 and the past output value managed by the internal state management unit 810, and updates the internal state. The internal state $C_t$ is updated by the following formulas (4) and (5). In the formulas, $i_t$ represents a coefficient for controlling the storage of a new internal state and takes a value in the range of [0,1].

$$i_t = \sigma(w_i[Y_{t-1}, X_t] + b_i) \quad (4)$$

$$C_t = C_t + i_t C' \quad (5)$$

In step 940, the output value calculation unit 830 converts the internal state into an output value based on the received feature vector and the past output value managed by the internal state management unit 810. The output value calculation unit 830 calculates an output value $Y_t$ at time t by the following formulas (6) and (7). In the formulas (6) and (7), $o_t$ represents a coefficient for controlling the output of the updated internal state and takes a value in the range of [0,1].

$$o_t = \sigma(w_o[Y_{t-1}, X_t] + b_o) \quad (6)$$

$$Y_t = o_t \sigma(C_t) \quad (7)$$

In the formulas (1) to (7), [,] represents coupling of feature vectors, φ represents a hyperbolic tangent function, and σ represents a sigmoid function. In addition, $w_c$, $b_c$, $w_f$, $b_f$, $w_i$, $b_i$, $w_o$, and $b_o$ are parameters obtained by pre-learning.

As described above, the flow estimation unit 260 sequentially receives, as an input, the number of objects in a plurality of divided regions of time-series images for each frame image and estimates the flow of objects. In the present exemplary embodiment, the flow estimation unit 260 uses not only the estimation result of the number of objects each of the divided regions, but also motion features for each divided region extracted from the time-series images, thereby enabling an accurate estimation of the flow objects.

As shown in the formula (5), the internal state $C_t$ includes the element corresponding to the feature vector $X_t$. Accordingly, the output value calculation unit 830 may extract the element corresponding to the feature vector from the internal state and update the object number estimation result in step S330. The updated object number estimation result is equivalent to the estimation result obtained by integrating the estimation results of the object number estimation unit 230 in time series, and thus a more accurate and more stable estimation result can be obtained.

In step S370, the determination unit 270 determines whether an abnormality has occurred based on a change in the flow of objects in the plurality of divided regions estimated in step S360. In the present exemplary embodiment, assume that an abnormality occurs in a case where the flow of people has rapidly changed. For example, if a person in a crowd has fallen down, the flow of people in a specific direction in an image may be delayed only in a region in which the person has fallen down, or the direction of the flow of people may be changed. The determination unit 270 obtains the direction of the flow of objects from the horizontal and vertical components of the representative motion vector output from the flow estimation unit 260, and also obtains a change in the direction for each divided region. A variation $\Delta\theta_{r,t}$ in the direction to be obtained is expressed by the following formula (8) assuming that representative motion vectors in a region r at time t and time (t−1) are represented by $(Vx_{r,t}, Vy_{r,t})$ and $(Vx_{r,t-1}, Vy_{r,t-1})$, respectively.

$$\Delta\theta_{r,t}=\text{Atan}(Vy_{r,t}/Vx_{r,t})-\text{Atan}(Vy_{r,t-1}/Vx_{r,t-1}) \quad (8)$$

In the formula (8), Atan represents an arctangent function.

The determination unit 270 obtains the variation in the direction for each divided region by the formula (8) and determines whether the obtained variation exceeds a predetermined threshold. When the determination unit 270 determines that the obtained variation exceeds the predetermined threshold, the determination unit 270 determines that an abnormality has occurred. When the determination unit 270 determines that the obtained variation does not exceed the predetermined threshold, the determination unit 270 determines that no abnormality has occurred.

In the present exemplary embodiment, the determination unit 270 determines whether an abnormality has occurred based on a change in the direction of the flow of objects. Alternatively, the determination unit 270 may determine whether an abnormality has occurred, based on a change in the direction of the flow of objects and a change in the magnitude of the flow of objects. Further, the determination unit 270 may determine whether an abnormality has occurred, based on a change in the direction of the flow of objects and the number of objects output from the object number estimation unit 230 or a change in the number of objects. Furthermore, the determination unit 270 may perform the processing of determining whether an abnormality has occurred, according to a predetermined rule, or by using a pre-learned neural network or LSTM.

Figure 10:
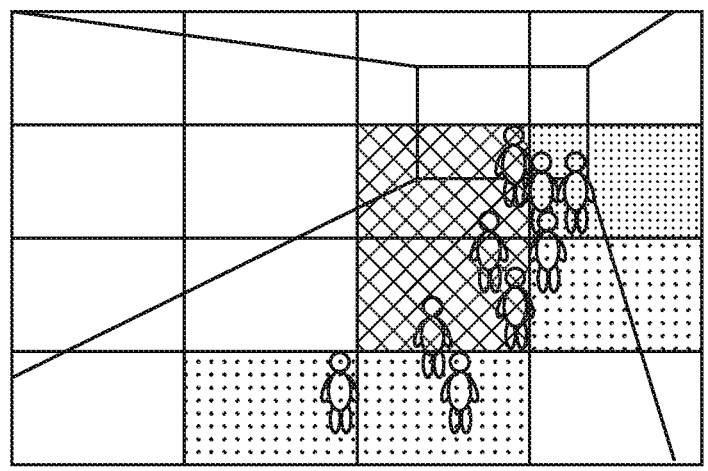
FIG. 10 illustrates an example of an object number estimation result according to one embodiment.
Figure 11:
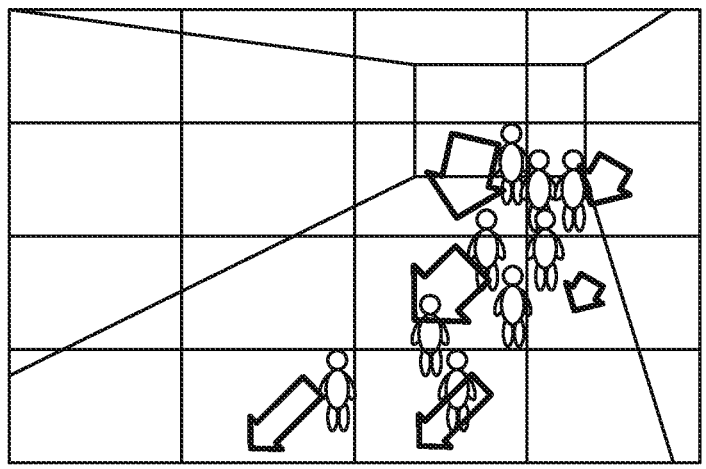
FIG. 11 illustrates an example of a flow estimation result according to one embodiment.
Figure 12:
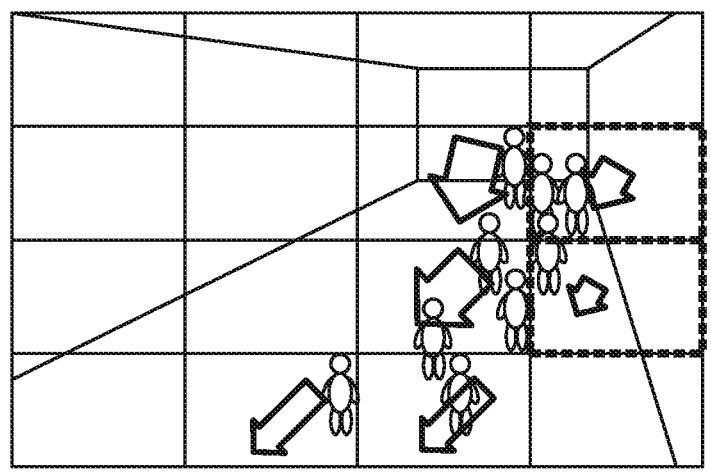
FIG. 12 illustrates an example of an abnormality determination result according to one embodiment.

In step S380, the display unit 280 displays the processing results of steps S330, S360, and S370, on the output device 140. FIGS. 10, 11, and 12 each illustrate a display example of exemplary processing results of steps S330, S360, and S370. The display unit 280 performs switching of the screens illustrated in FIGS. 10 to 12 according to an operation through the input device 130. In FIG. 10, a higher density in each divided region indicates a region with a larger number of people. Each arrow in FIG. 11 represents the number of people in each divided region and the direction and velocity of the flow of people. An arrow with a wider width in FIG. 11 indicates a larger number of people. The direction of each arrow in FIG. 11 indicates the direction of the flow of objects. An arrow with a longer length in FIG. 11 indicates a higher velocity of the flow of objects. Thus, in the present exemplary embodiment, the number of objects and the flow of objects are represented by the shape of an arrow. Instead of using an arrow, the shape of another graphic, such as a segment, a triangle, a rectangle, may be used to represent the number of objects and the flow of objects. An area surrounded by a dotted line in FIG. 12 represents a divided region which is identified as the region where it is determined that an abnormality has occurred.

As described above, in the present exemplary embodiment, the information processing apparatus 100 estimates the number of objects included in each of a plurality of divided regions of time-series images, integrates the estimation results for the plurality of divided regions, and sequentially outputs the integrated estimation results to the flow estimation unit 260 for each frame image, thereby estimating the flow of the objects. Consequently, the information processing apparatus 100 can estimate not only the number of objects in the time-series images, but also the flow of objects by using the information about the number of objects, and thus can accurately grasp the state of objects in the space.

Further, the information processing apparatus 100 can determine whether an abnormality has occurred, based on a change in the flow of objects.

In the present exemplary embodiment, the object number estimation unit 230 and the feature extraction unit 240 are configured using a neural network. However, the configuration of the object number estimation unit 230 and the feature extraction unit 240 is not limited to this. For example, the object number estimation unit 230 may use a method of counting the number of people detected using a classifier for detecting a person. The feature extraction unit 240 may extract a motion vector itself as a motion feature.

Figure 13:
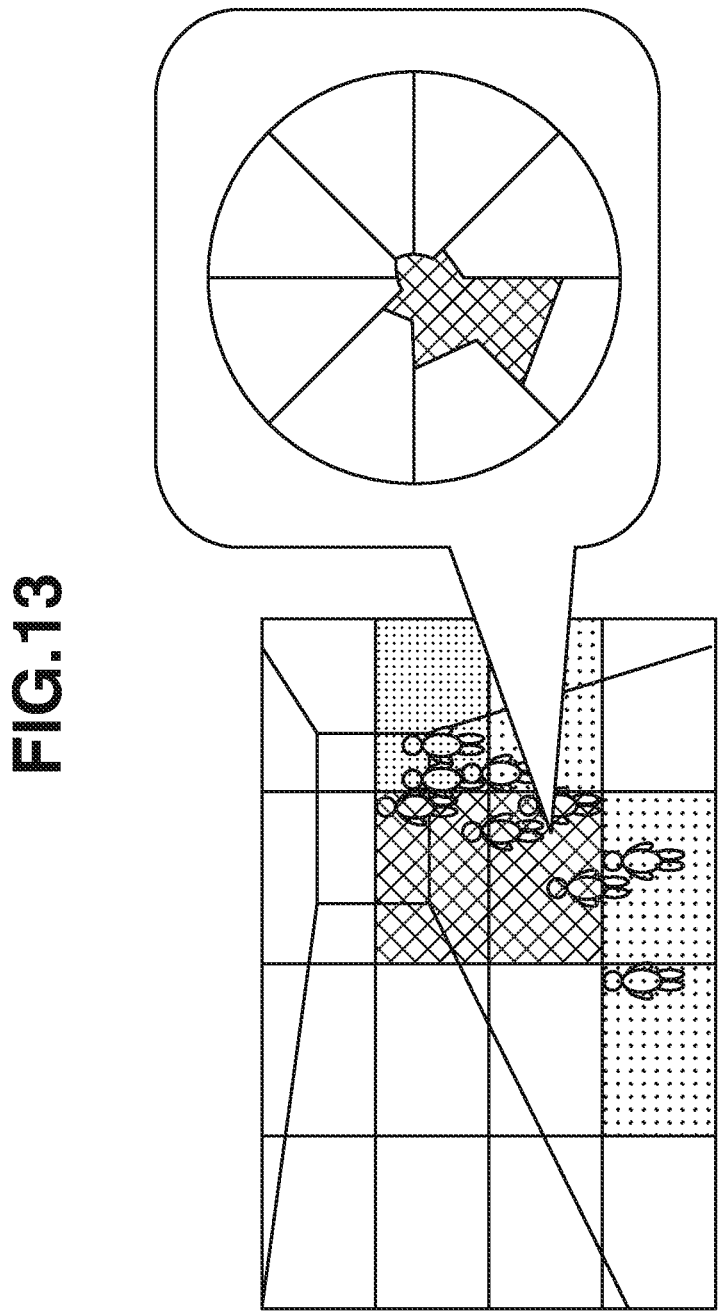
FIG. 13 illustrates an example of the flow estimation result according to one embodiment.

Further, the flow estimation unit 260 may use another method as long as a method is used which estimates the flow of objects by sequentially inputting, in time series, estimation results of the number of objects in a plurality of divided regions. In the present exemplary embodiment, the flow estimation unit 260 outputs the representative motion vector for each divided region, but instead may output a probability that the flow of objects estimated for each divided region is directed in each direction. For example, the flow estimation unit 260 can divide the direction of the flow of objects into eight directions and output, to the determination unit 270, the probability that the flow of objects is directed in each of the eight directions, thereby providing more detailed information. In this case, the display unit 280 displays, on the output device 140, the estimation result obtained by the flow estimation unit 260 in a display mode as illustrated in FIG. 13. The display unit 280 may display the probability that the flow of objects is directed in each direction as illustrated in FIG. 13 when a certain region in the screen indicating the estimation result obtained by the object number estimation unit 230 illustrated in FIG. 10 is designated through the input device 130. In FIG. 13, a gray area represents an estimated probability in each direction.

In the present exemplary embodiment, the flow estimation unit 260 outputs the estimation result by displaying the estimation result on the output device 140 through the display unit 280. Aternatively, the flow estimation unit 260 may output the estimation result by storing the estimation result as a file or the like in the storage device 120. Further, the flow estimation unit 260 may output the estimation result by transmitting the estimation result to a set notification destination.

An example in which the processing according to the present exemplary embodiment is employed for the case where a person is detected from an image has been described above. However, the information processing apparatus 100 can also estimate the number of objects other than a person for each divided region and estimate the flow of the objects.

While exemplary embodiments have been described in detail above, the present disclosure is not limited to specific exemplary embodiments. Further, the exemplary embodiments described above may be arbitrarily combined.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-074335, filed Apr. 4, 2017, which is hereby incorporated by reference herein in its entirety.

What is claimed is:

1. An information processing apparatus comprising:
one or more processors; and
one or more memories coupled to the one or more processors, the one or more memories having stored thereon instructions which, when executed by the one or more processors, cause the information processing apparatus to perform operations comprising:
acquiring a plurality of images successive in time series captured by a camera;
dividing each of the plurality of acquired images into a plurality of regions;
estimating, for each of the plurality of acquired images, a number of objects existing in the each of the plurality of divided regions by using a neural network;
extracting a motion feature of each of the plurality of regions, by using the plurality of images successive in time series;
integrating, for each of the plurality of images, respective numbers of objects estimated for the plurality of regions and respective motion features extracted for the plurality of regions, to obtain integrated information;
estimating, for each region of the plurality of regions, a flow of the objects existing in that region based on the integrated information for successive images in the plurality of images and an estimator outputting the flow of the objects for the each divided region; and
causing a display to display respective flows of the objects estimated for the plurality of regions,
wherein the integrated information is a feature vector which is generated by combining the respective numbers of objects estimated for the plurality of regions and the respective motion features extracted for the plurality of regions, and which is to be input to the estimator.

2. The information processing apparatus according to claim 1, wherein the operations further comprise storing in a storage an internal state used for estimating the flow of objects,
wherein the estimating the flow of the objects comprises updating the internal state stored in the storage based on the integrated information obtained through the integrating and the internal state stored in the storage, and
estimating the flow of objects existing in each of the plurality of regions based on the updated internal state.

3. The information processing apparatus according to claim 2, wherein the estimating the flow of the objects comprises updating, based on the updated internal state, the estimated number of objects.

4. The information processing apparatus according to claim 1, wherein the integrating integrates, for each of the images successive in time series, a result of the estimating of the number of objects, for each of the plurality of regions, with an output of at least one of layers included in the neural network, to obtain the integrated information.

5. The information processing apparatus according to claim 1, wherein the operations further comprise outputting the estimated number of objects for each of the plurality of regions.

6. The information processing apparatus according to claim 5, wherein the outputting outputs, for each of the plurality of regions, the estimated number of objects by displaying the number of objects on a display.

7. The information processing apparatus according to claim 6, wherein the outputting allows the estimated number of objects in each of the plurality of regions to be represented in a display form for each of the plurality of regions.

8. The information processing apparatus according to claim 1, wherein the operations further comprise outputting the estimated flow of objects for each of the plurality of regions.

9. The information processing apparatus according to claim 8, wherein the outputting outputs the estimated flow of objects for each of the plurality of regions by displaying the flow of objects on a display.

10. The information processing apparatus according to claim 9, wherein the outputting allows the estimated flow of objects to be represented by a shape of a graphic.

11. The information processing apparatus according to claim 10, wherein the outputting allows an amount of the estimated flow of objects to be represented by a width of a graphic.

12. The information processing apparatus according to claim 10, wherein the outputting allows a velocity of the estimated flow of objects to be represented by a length of a graphic.

13. The information processing apparatus according to claim 1, wherein the operations further comprise determining whether an abnormality has occurred, based on the estimated flow of objects.

14. The information processing apparatus according to claim 13, wherein the determining determines whether an abnormality has occurred, based on a change in the estimated flow of objects.

15. The information processing apparatus according to claim 14, wherein the operations further comprise identifying and displaying a region among the plurality of regions with regard to which the determining determines that an abnormality has occurred.

16. An information processing method comprising:
   acquiring a plurality of images successive in time series captured by a camera;
   dividing each of the plurality of acquired images into a plurality of regions;
   estimating, for each of the plurality of acquired images, a number of objects existing in the each of the plurality of divided regions by using a neural network;
   extracting a motion feature of each of the plurality of regions, by using the plurality of images successive in time series;
   integrating, for each of the plurality of images, respective numbers of objects estimated for the plurality of regions and respective motion features extracted for the plurality of regions, to obtain integrated information;
   estimating, for each region of the plurality of regions, a flow of the objects existing in that region based on the integrated information for successive images in the plurality of images and an estimator outputting the flow of the objects for the each divided region; and
   causing a display to display respective flows of the objects estimated for the plurality of regions,
   wherein the integrated information is a feature vector which is generated by combining the respective numbers of objects estimated for the plurality of regions and the respective motion features extracted for the plurality of regions, and which is to be input to the estimator.

17. A non-transitory computer-readable storage medium storing a program for causing a computer to perform a process, the process comprising:
   acquiring a plurality of images successive in time series captured by a camera;
   dividing each of the plurality of acquired images into a plurality of regions;
   estimating, for each of the plurality of acquired images, a number of objects existing in the each of the plurality of divided regions by using a neural network;
   extracting a motion feature of each of the plurality of regions, by using the plurality of images successive in time series;
   integrating, for each of the plurality of images, respective numbers of objects estimated for the plurality of regions and respective motion features extracted for the plurality of regions, to obtain integrated information;
   estimating, for each region of the plurality of regions, a flow of the objects existing in that region based on the integrated information for successive images in the plurality of images and an estimator outputting the flow of the objects for the each divided region; and
   causing a display to display respective flows of the objects estimated for the plurality of regions,
   wherein the integrated information is a feature vector which is generated by combining the respective numbers of objects estimated for the plurality of regions and the respective motion features extracted for the plurality of regions, and which is to be input to the estimator.

* * * * *